(12) United States Patent
Skeren et al.

(10) Patent No.: US 12,025,823 B2
(45) Date of Patent: Jul. 2, 2024

(54) VOLUME OPTICAL ELEMENTS

(71) Applicant: IQ STRUCTURES S.R.O., Husinec-Rez (CZ)

(72) Inventors: Marek Skeren, Nova Ves I (CZ); Lenka Matulova, Prague (CZ); Roman Houha, Prague (CZ)

( * ) Notice: Subject to any disclaimer, the term of this patent is extended or adjusted under 35 U.S.C. 154(b) by 547 days.

(21) Appl. No.: 17/046,842

(22) PCT Filed: Apr. 11, 2019

(86) PCT No.: PCT/EP2019/059361
§ 371 (c)(1),
(2) Date: Oct. 12, 2020

(87) PCT Pub. No.: WO2019/197588
PCT Pub. Date: Oct. 17, 2019

(65) Prior Publication Data
US 2021/0116715 A1 Apr. 22, 2021

(30) Foreign Application Priority Data

Apr. 12, 2018 (GB) ..................................... 1806061

(51) Int. Cl.
*G02B 5/32* (2006.01)
*G03H 1/02* (2006.01)

(52) U.S. Cl.
CPC .............. *G02B 5/32* (2013.01); *G03H 1/0248* (2013.01)

(58) Field of Classification Search
None
See application file for complete search history.

(56) References Cited

U.S. PATENT DOCUMENTS

| 4,856,857 | A | | 8/1989 | Takeuchi et al. |
| 5,896,227 | A | * | 4/1999 | Toriumi ................. B29C 70/74 |
| | | | | 359/536 |
| 5,910,858 | A | * | 6/1999 | Frey ....................... G02B 5/128 |
| | | | | 359/534 |
| 2011/0007374 | A1 | | 1/2011 | Heim |
| 2011/0045248 | A1 | | 2/2011 | Hoffmuller et al. |

FOREIGN PATENT DOCUMENTS

| DE | 199 47 425 | 4/2001 |
| JP | 2012-066544 | 4/2012 |
| JP | 2014-104640 | 6/2014 |
| WO | WO 2015/172190 | 11/2015 |

OTHER PUBLICATIONS

International Searching Authority: International Search Report and Written Opinion, App. No. PCT/EP2019/059361 (dated Jul. 23, 2019).
Intellectual Property Office: Search Report, App. No. GB1806061.6 (dated May 5, 2019).

* cited by examiner

*Primary Examiner* — Jennifer D. Carruth
(74) *Attorney, Agent, or Firm* — Walters & Wasylyna LLC

(57) ABSTRACT

A volume diffractive optical element (E) comprising: a carrier (1) having an optical relief pattern (P) on at least one surface thereof, and at least one optically functional layer (2) applied over or onto at least one or more portions or relief features (P) of the relief pattern on the carrier (1); wherein in embodiments the at least one optically functional layer (2) comprises a plurality of discrete bodies, beads or globules (2) of optical material applied over or onto the respective individual relief portions or relief features or relief elements (P) of the relief pattern on the carrier (1).

16 Claims, 2 Drawing Sheets

VOLUME OPTICAL ELEMENTS

This application is a U.S. national phase application of Intl. App. No. PCT/EP2019/059361 filed on Apr. 11, 2019, which claims priority from GB1806061.6 filed on Apr. 12, 2018. The entire contents of PCT/EP2019/059361 and GB1806061.6 are incorporated herein by reference.

TECHNICAL FIELD

This invention relates to volume optical elements. More particularly, though not exclusively, it relates to volume diffractive optical elements. The invention also relates to methods for the production of such volume optical elements. The invention further relates to articles, items or devices which comprise or incorporate one or more such volume optical elements, e.g. for security and/or identification purposes.

BACKGROUND AND PRIOR ART

Optical elements employing diffraction, which is to say so-called "diffractive optical elements" (DOEs), are currently implemented mainly in the form of embossed optical elements. This is because typically the industrial process used for their production involves the creation of a diffractive relief pattern, called the "master", from which an embossing tool is made. This tool is then used to replicate the relief pattern in various ways, such as by hard embossing, soft embossing, UV casting, etc. The result is a carrier, typically in the form of a film or sheet layer with a thickness of the order of microns, e.g. from around 12 up to maybe around 100 microns, with the diffractive relief on one surface side thereof. This technology is mainly used because of the significant efficiency of the production process.

Technology of relief embossing can also be used for the production of functional surface applications, for example a specific surface relief providing a hydrophobic function of the surface.

However, there are various limitations associated with known methods of replication of surface relief by embossing from a master. From an optical point of view, for diffractive optical elements, this limitation often restricts known embossing methods to the production of so-called thin diffractive elements, which typically have limited diffractive efficiency and different angular constraints in imaging (e.g. typically lacking spatial parallax in one viewing direction or viewing angle).

These constraints can sometimes be eliminated by spatial modulation of the refractive index of the carrier material, for example in the production of volume diffractive elements used mainly for 3D imaging. However, these volume diffractive elements cannot be made by embossing the surface of the carrier, and so other methods need to be used to record the relevant relief pattern in the production of such volume diffractive elements. The most well-known among such other methods include optical recording of spatial diffractive structures in optically active recording materials such as dichromated gelatin (DCG), halogen-silver emulsions, photopolymers, etc. These procedures are, however, more expensive compared to the replication of diffractive relief using relief embossing, so are much less favourable for use on an industrial scale.

In terms of geometry and possible replication patterns, the ability and ease of replication of surface relief is also often limited, in particular in terms of the ratio of the depth and spacing of the replicated relief peaks and the replicated relief shape, which generally must be sufficiently open (e.g. Gaussian in relief profile) in order to be able physically to separate the replication form from the replicated relief on the carrier once formed.

Furthermore, some practical applications of optical elements lead to a requirement for reliefs to have cavities within the relief itself, e.g. so-called zip reliefs or closed reliefs. These closed reliefs can generally only be replicated by complex procedures, e.g. multiple masking with partial removal of the masks. These procedures are, however, more expensive compared to simple replication of the diffractive relief using a relief embossing-type process.

Thus, in the context of volume diffractive optical elements, the current art presents significant shortcomings and limitations in the methods available for their production and the efficient replication of diffractive reliefs therein. It is therefore a primary object of the present invention to address and ameliorate these shortcomings and limitations in the known art.

SUMMARY OF THE INVENTION

Accordingly, in a first aspect of the present invention there is provided a volume optical element comprising:
  a carrier having an optical relief pattern on at least one surface thereof, and
  at least one optically functional layer applied over or onto at least one or more portions or relief features of the relief pattern on the carrier.

In many embodiments of the above-defined volume optical element the optical relief pattern on the carrier is or comprises a diffractive optical relief pattern.

In some embodiments of the above-defined volume optical element, the at least one optically functional layer may comprise a plurality of discrete bodies, beads or globules of optical material applied over or onto respective individual relief portions or relief features or relief elements of the relief pattern on the carrier. In some such embodiments the bodies, beads or globules of optical material forming the at least one optically functional layer may be substantially separate or spaced from each other, especially in a general direction corresponding to or parallel to the general plane of the carrier. Thus, in some such embodiments the at least one optically functional layer may be substantially discontinuous over one or more portions, regions or areas of the relief pattern on the carrier.

However, in some other embodiments of the above-defined volume optical element, the at least one optically functional layer may comprise a substantially continuous layer of the said optical material applied over or onto respective individual relief portions or relief features or relief elements of the relief pattern on the carrier. In some forms such a substantially continuous optically functional layer may be considered to be, or may be formed by, a plurality of discrete bodies, beads or globules of the optical material which have been merged together during, or optionally after, the application thereof onto the carrier. Thus, in some such embodiments the at least one optically functional layer may be substantially continuous over one or more portions, regions or areas of the relief pattern on the carrier.

In any of the above embodiments, the or each of the bodies, beads or globules of optical material forming the optically functional layer may be of any suitable shape and/or positional configuration relative to portion(s) or relief feature(s) of the relief pattern on the carrier over or onto which they are applied. For example, such bodies, beads or globules may be generally substantially spherical or partspherical, or ovoid or part-ovoid, or of any other symmetrical or asymmetrical shape in cross-section, or they may even be elongated in a direction or axis corresponding or parallel to the general plane of the carrier.

Alternatively or additionally in any of the above embodiments, the or each of the bodies, beads or globules of optical material forming the optically functional layer may be positioned or located atop or around, or at least partially surrounding an upper portion of, any one or more respective portions or relief features of the relief pattern on the carrier.

In many embodiments of the invention the total thickness of the volume optical element may typically be in the approximate range of from about 2 μm up to about 500 μm. In some such embodiments the total thickness of the volume optical element may be in the more preferred approximate range of from about 10 μm up to about 110 μm.

In some embodiments the carrier may have a general thickness, or an average thickness if the surface relief pattern is taken into account in that calculation, in the approximate range of from about 2 μm up to about 350 μm, optionally in the narrower range of from about 10 μm up to about 100 μm.

In some embodiments the or each of the at least one optically functional layer(s) may have an overall general thickness, or an overall average thickness if any non-planar surface profile thereof is taken into account in that calculation, in the approximate range of from about 5 nm up to about 150 μm, optionally in the narrower range of from about 10 nm up to about 10 μm.

In a second aspect of the present invention there is provided a method for the production of a volume optical element, the method comprising:
    providing a carrier having an optical relief pattern on at least one surface thereof, and
    applying over at least one or more portions or relief features of the relief pattern on the carrier at least one optically functional layer.

In many practical embodiments of the above-defined production method, the application of the at least one optically functional layer over the at least one or more portions or relief features of the relief pattern on the carrier may be carried out by a deposition method comprising vacuum deposition or vacuum sputtering.

Embodiments and optional or preferred features of the above-defined production method may correspond to or be the same as various embodiments and optional or preferred features of embodiment volume optical elements per se as defined or described elsewhere in this specification.

In a third aspect of the present invention there is provided a security device, especially an optical security device, comprising or including a volume optical element according to the first aspect of the invention or any embodiment thereof.

In practising some embodiments of the invention, it has been usefully found that there is a possibility of producing modulated functional layers, e.g. of oxide material, which exhibit similar or corresponding parameters to those of conventional thin or even volume diffractive optical elements. Also in terms of geometry, it has been found possible to create different types of general spatial structures with defined functions in the final surface relief on the carrier surface layer.

In some embodiments of the invention a key role is played by the carrier, e.g. in the form of a pad or film or foil, which may contain an e.g. specially tuned micro-relief pattern on the surface thereof, which may be termed a so-called precursor relief. This relief acts as a precursor to the modulation of the applied or deposited optically functional layer.

In practising some embodiments of the invention, for the application of the desired optically functional layer onto or over the carrier, any suitable application or deposition technique may be used. One especially useful technique may be vacuum sputtering. Such a technique may be carried out using well-known apparatus and practical method steps, as the skilled person will be well cognisant of. Such a vacuum sputtering process may be particularly useful by virtue of its being able to exploit and take account of inhomogeneities and anisotropy initiated by the precursor relief geometry.

In practising some embodiments of the invention, it has been found especially useful that microstructures with e.g. a periodic or a quasi-periodic relief with a period less than the characteristic Debye length of the discharge plasma used in the sputtering process, and the respective ratio of period and depth relative to the sputtering process, may be produced with highly modulated layers as a result of vacuum deposition.

On the basis of this effect, in some embodiments of the invention, instead of the at least one optically functional layer comprising a plurality of discrete bodies, beads or globules of optical material applied over or onto respective individual relief portions or relief features or relief elements of the relief pattern on the carrier, the formation of a final optically functional layer, especially a highly modulated such layer, may be achieved by subjecting the applied bodies, beads or globules to an agglomeration or merging process, e.g. through the application of a suitable elevated heat and/or pressure step, or alternatively by subjecting the applied bodies, beads or globules to an infilling step using the same or a compatible material to the bodies, beads or globules themselves so as to at least partially fill the gaps or spaces between them to form the final, especially homogenous, optically functional layer, especially one with the originally applied bodies, beads or globules embedded therewithin. In this manner, in such embodiments a particularly useful highly functional optical layer or a newly profiled shape of the applied optically functional layer may be produced.

Taking the preceding embedded or newly-profiled embodiments an optional stage further, in some further embodiments of the invention the resulting exposed upper surface of the merged or infilled optically functional layer may be back-scratched, scraped, polished or otherwise eroded or abraded, e.g. by any suitable known means, in order to create a substantially planar or flat exposed upper surface of the applied optically functional layer on the carrier.

Thus, in some embodiments, under suitable conditions it may be possible to effectively reshape an already existing functional layer relative to the underlying relief so as to alter the resulting optical function of the optical element. It may be advantageous for some optical functions to have the functional layer planar on one side. In this case, this reshaping may thus be advantageously carried out during such a vacuum coating (or deposition) step, as opposed to using a conventional vacuum evaporation or sputtering technique, where this result generally cannot be achieved.

In practising various embodiments of the invention various materials may advantageously be used to form the various layers of the volume optical elements. For instance:

For the implementation of the basic precursor relief, the basic carrier material may be selected from natural or synthetic polymeric materials, such as PET (polyethylene terephthalate), PC (polycarbonate), PE (polyethylene) or PP (polypropylene), or various metals, e.g. Al, Ag, Au, Cu, Ni, etc., or even various ceramics, e.g. oxide ceramics (such as lithium cobalt oxide, etc.) or carbon ceramics or composite ceramics, or even various geopolymers.

For the material of the applied at least one optically functional layer, any one or more of various metal oxides may be used, in particular oxides which exhibit optical anisotropy. Suitable examples of such oxides which may be suitable for use in embodiments of the invention as the at least one functional layer may include $TiO_2$ and especially $Ta_2O_5$, which latter material (tantalum oxide) has a high sputtering yield compared to $TiO_2$ and so may be especially preferable. Examples of other suitable materials may include $Fe_2O_3$, $Co_3O_4$, $ZrO_2$, $WO_3$ and $ZnO$.

Commercially available practical examples of each of the above-listed materials are widely available and well-known to persons skilled in the art.

In some embodiments of the invention the material of the at least one optically functional layer may have a refractive index that is different, or significantly different, from the refractive index of the matter of the carrier. In the case of embodiments in which a plurality of optically functional layers are applied to the carrier, the material of any given one or more of the optically functional layers may have a different or significantly different, or alternatively substantially or approximately the same, refractive index as any other one or more of the optically functional layers.

However, in certain other embodiments it may be possible for the refractive indices of the materials of the at least one optically functional layer (or at least one thereof) and the carrier to be substantially or approximately the same.

In practising various embodiments of the invention, the at least one functional layer thus formed on the carrier may exhibit significantly different optical properties than many known commonly replicated continuous binary, Gaussian, blazed or otherwise modulated reliefs in the production of known optical elements, since the functional layer's bodies, beads or globules applied or deposited on the carrier may in certain embodiments be shaped or configured so as to be closer together, relative to one another, at their top or upper portions or regions than at their bottom or lower portions or regions, which shape cannot be replicated by embossing from a master relief using known production methods for known optical elements.

In some further embodiments of the invention the volume optical element may comprise a plurality of optically functional layers, especially at least one first optically functional layer applied over or onto at least one or more portions or relief features of the relief pattern on the carrier, and one or more second or subsequent optically functional layers applied over the first optically functional layer, so as to form a plural-layered volume optical element comprising a plurality of individual optically functional layers sandwiched one on top of another.

In practising such embodiments, the individual plural optically functional layers may be applied sequentially, one after another, and especially using substantially the same technique to apply each one in a sequential, plural-stage deposition method.

Moreover, each of the individual optically functional layers of such plural-layered volume optical elements may be composed of or comprise the same or a different material as any adjacent or neighbouring such layer.

Furthermore, in creating such plural-layered volume optical elements, in some embodiments each optically functional layer may be applied together with its own underlying discrete basal sub-carrier layer with its own, optionally its own unique, relief pattern thereon. Thus, in such embodiments it is possible for repeated pairs of sub-carrier layer and optically functional layer thereon to be placed or applied one on top of another, to build up a complex multi- (or plural-) layered volume optical element comprising:

a plurality of carrier sub-layers each having an optical relief pattern on at least one surface thereof, and applied over or onto at least one or more portions or relief features of the relief pattern on respective ones of the carrier sub-layers, respective ones of a plurality of optically functional layers.

Such plural-layered volume optical elements may be particularly useful for creating more complex spatial modulation of the overall resulting optically functional layer, e.g. for creating 3D refractive index modulation therein, and are not limited by or to a single given planar design of any one functional layer.

In putting various embodiments of the invention to practical use, the thus created planar or 3D volume structures of the volume optical elements so produced by embodiments of the invention may if desired or necessary be further processed for various end-use applications.

For example, when laminating certain embodiment volume optical elements which comprise planar or 3D optically functional layers that are composed from a plurality of separated discrete bodies, beads or globules of optical material, the material of the carrier and/or of a separately applied or superimposed over-layer or laminating layer may move, under the conditions of elevated heat and/or pressure, into and/or through the gaps or openings in between the functional layer's bodies, beads or globules during a subsequent lamination step. In this way, the optically functional layer structure may end up being fixed within the final overall laminated body without changing its inherent optically functional structure.

Other onward processing techniques and method steps applicable to embodiment volume optical elements according to the invention may also be possible.

Embodiments of the present invention may be applied to a wide variety of end-uses, in particular to a wide range of optical security applications where an optical security feature is desired to be incorporated into a product, item or article, e.g. banknotes, securities, credit and debit cards, tickets, passports, visas, ID cards, branded goods, and various other items whose value or nature benefits from an added security feature.

Within the scope of this specification it is envisaged that the various aspects, embodiments, examples, features and alternatives, and in particular the individual constructional or operational features thereof, set out in the preceding paragraphs, in the claims and/or in the following description and accompanying drawings, may be taken independently or in any combination of any number of same. For example, individual features described in connection with one particular embodiment are applicable to all embodiments, unless expressly stated otherwise or such features are incompatible.

BRIEF DESCRIPTION OF THE DRAWINGS

Some embodiments of the invention in its various aspects will now be described in detail, by way of example only, with reference to the accompanying drawings, in which.

DETAILED DESCRIPTION OF EMBODIMENTS

Figure 1:
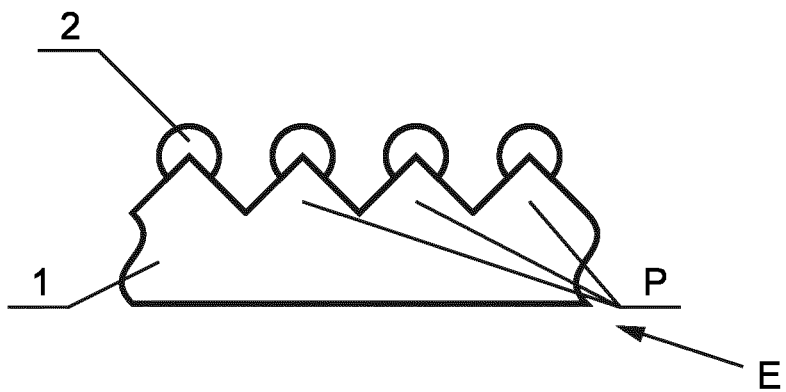
FIG. 1 is a schematic cross-sectional view of a volume diffractive optical element according to a first embodiment of the invention.

Referring firstly to FIG. 1, this shows a first embodiment of a volume diffractive optical element E in accordance with the invention, which first embodiment may be considered to represent an example of the invention being implemented in its simplest and most basic form. The element E comprises a carrier or substrate layer 1, shown schematically with a diffractive relief pattern P formed in its upper surface by any suitable conventional technique. The carrier/substrate layer may be formed of e.g. polycarbonate, or alternatively another suitable precursor material such as other polymers (e.g. PET, PE, PP) or possibly even suitable metals or ceramics.

Formed on top of the carrier relief P, e.g. by any suitable vacuum sputtering process—practical procedures and apparatus for which are well-known and readily available in the art—is a deposited layer 2 in the form of discrete bodies or globules or beads 2 of an optically functional material, e.g. tantalum oxide ($Ta_2O_5$), or alternatively another suitable material such as $TiO_2$ or perhaps even $Fe_2O_3$, $Co_3O_4$, $ZrO_2$, $WO_3$ and ZnO.

The materials of the carrier 1, with its relief pattern P, and the deposited layer 2 are preferably selected such that they have different, especially significantly different, refractive indices.

The discrete bodies or globules or beads 2 are applied or deposited over or onto respective individual relief portions or relief features or relief elements of the relief pattern on the carrier 1, as shown schematically in FIG. 1, by virtue of them at least partially enclosing or surrounding an upper or peak portion or region of individual ones of (or groups of) the relief features. The size, shape, configuration, orientation and distribution of the individual bodies or globules or beads may be readily controlled by appropriate selection or control of the parameters of the vacuum sputtering deposition process.

Thus, the bodies or globules or beads 2 are separated from each other, so that they form a discontinuous layer 2 of discrete such bodies, globules or beads on the relief pattern P.

The resulting volume diffractive optical element E according to this embodiment of the invention may thus exhibit different optical properties from an equivalent prior art optical element produced by simple relief embossing of the relief pattern into the carrier with respect to the modulation options imparted by the individual bodies or globules or beads 2 forming the optically functional layer.

Figure 2:
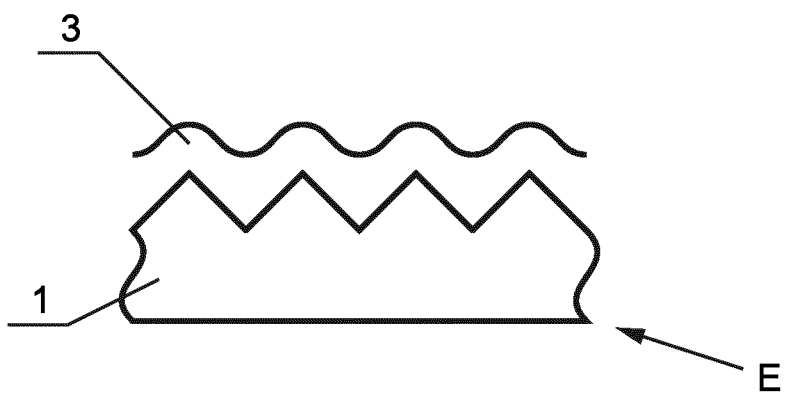
FIG. 2 is a schematic cross-sectional view of a volume diffractive optical element according to a second embodiment of the invention.

FIG. 2 shows another embodiment of a volume diffractive optical element in accordance with the invention. In this embodiment the deposited layer 2 of optically functional material has, instead of being applied as discrete bodies or globules or beads 2, been applied—or has been subjected to a post-application processing step e.g. involving the application of elevated heat and/or pressure—so as to instead form an optically functional layer in the form of a continuous homogenous functional layer 3. In this manner the discrete bodies, beads or globules of optical material applied in the manner shown in FIG. 1 can be considered to have been merged or agglomerated together into a homogenous functional layer 3.

A particular advantage of this variant form show in FIG. 2 is that the resulting homogenous functional layer 3 may itself retain or exhibit its own new relief profile shape. In this manner it may be possible to create a new highly functional configuration of functional relief layer 3 atop the carrier 1.

Figure 3:
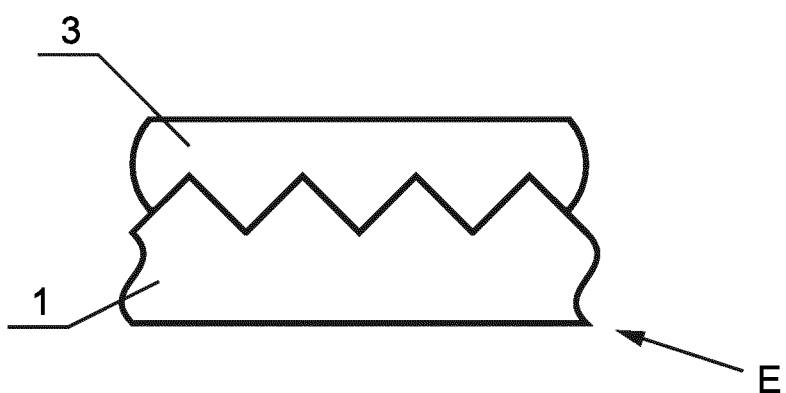
FIG. 3 is a schematic cross-sectional view of a volume diffractive optical element according to a third embodiment of the invention.

FIG. 3 shows another embodiment of a volume diffractive optical element in accordance with the invention. In this embodiment the resulting exposed upper surface of the already-deposited or merged or infilled optically functional layer 3 of FIG. 2 may be back-scratched, scraped, polished or otherwise eroded or abraded, e.g. by any suitable known means, in order to create a substantially planar or flat exposed upper surface of the applied optically functional layer 3 on the carrier 1, as shown in its final form in FIG. 3. The back-scratching, scraping, polishing or other erosion or abrasion step(s) may typically be carried out under vacuum conditions.

Figure 4:
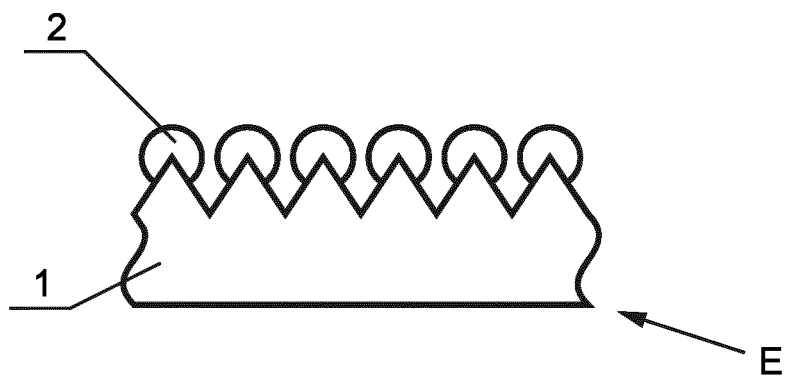
FIG. 4 is a schematic cross-sectional view of a volume diffractive optical element according to a fourth embodiment of the invention.

FIG. 4 shows another embodiment of a volume diffractive optical element in accordance with the invention. In this embodiment the discrete bodies or globules or beads 2 forming the functional layer 2 are shaped or configured so as to be larger in size and/or to be closer together, relative to one another, at their top or upper portions or regions than at their bottom or lower portions or regions. This modified configuration may be achieved by appropriate selection or control of the parameters of the vacuum sputtering deposition process. This shape of applied functional layer features cannot be replicated by simple embossing from a master relief using known production methods for known optical elements.

By way of example, this form of element E as shown schematically in FIG. 4 may be useful for forming a hydrophobic functional surface on the finished element E, wherein the relatively closed-up relative spacings of the individual bodies or globules or beads 2 of the resulting functional relief profile on the peaks of the carrier relief pattern P corresponds to the necessary parameters for imparting hydrophobicity to the resulting upper surface.

Figure 5:
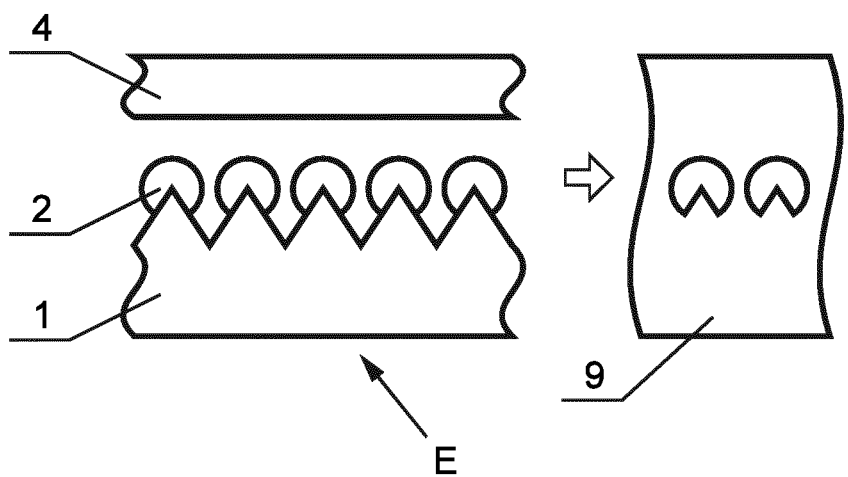
FIG. 5 is a schematic cross-sectional view of a volume diffractive optical element according to a fifth embodiment of the invention.

FIG. 5 shows another embodiment of a volume diffractive optical element in accordance with the invention. In this embodiment a basic volume optical element E according to the invention such as that shown in FIG. 1 may be further processed by subjecting it to a lamination process. For example, as shown schematically in FIG. 5, such a volume optical element E, comprising a generally planar or 3D optically functional layer 2 composed from the above-described plurality of separated discrete bodies, beads or globules 2 of optical material, has applied or superimposed thereover an over-layer or laminating layer 4, and the combined arrangement may optionally be subjected to elevated heat and/or pressure. As a result of this lamination, the material of the carrier and/or of the over-layer or laminating layer 4 may move into and/or through the gaps or openings in between the functional layer's bodies, beads or globules 2 during the lamination step. In this way, the optically functional layer structure 2 may end up being fixed or incorporated within the final overall laminated body 9, especially without changing its inherent optically functional structure. This final arrangement is shown schematically in the right-hand side portion of FIG. 5.

The above example embodiments all illustrate the application and use of single functional layers on the carrier. However, in other embodiments of the invention plural such functional layers may be applied to the carrier instead, in order to build up a multi-layer (or plural-layer) or sandwiched volume optical element structure comprising any number of optical functional layers on top of a base carrier. In particular, in some such embodiments a complex multi- (or plural-) layered volume optical element may be constructed by building up, one on top of another, e.g. by sequential bonding and vacuum deposition/sputtering as appropriate, a plurality of pairs of a carrier sub-layer with an applied relief pattern thereon and a respective optically functional layer applied thereon (which latter respective functional layers may each be of any suitable form or configuration as described in any of the embodiments discussed above). It may even be possible for example for each of the [carrier-sub-layer+functional-layer] pairs to have a different relief pattern and thus inherent optical function, whereby particularly complex overall volume optical element structures may be built up.

Figure 6:
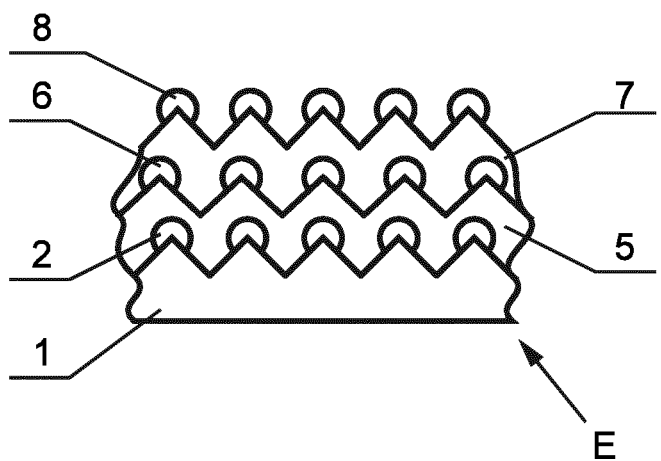
FIG. 6 is a schematic cross-sectional view of a volume diffractive optical element according to a sixth embodiment of the invention.

On such example of a plural-layered volume optical element is shown schematically in FIG. 6. In this embodiment the various functional layers 2, 6, 8 are grouped, together with their associated respective relief-carrying carrier sub-layers 1, 5, 7 into respective dual-layer sub-structures by sequential layering thereof, thereby for example leading to the creation of a final element E which may exhibit a more complex overall spatial modulation property of its combined functional layers 2, 6, 8 (e.g. 3D refractive index modulation), without being limiting by or to a single given planar design of any one functional layer.

Preferably the material(s) used to form each of the functional layers 2, 6 and 8 has/have a different refractive index from the material(s) used to form each of their respective associated carrier sub-layers 1, 5, 7.

Thus, this plural-layer structure such as that illustrated schematically in FIG. 6 can produce 3D spatial modulation of the resulting combined functional layer formed by the sub-layers 2, 6 and 8.

Throughout the description and claims of this specification, the words "comprise" and "contain" and linguistic variations of those words, for example "comprising" and "comprises", mean "including but not limited to", and are not intended to (and do not) exclude other moieties, additives, components, elements, integers or steps.

Throughout the description and claims of this specification, the singular encompasses the plural unless expressly stated otherwise or the context otherwise requires. In particular, where the indefinite article is used, the specification is to be understood as contemplating plurality as well as singularity, unless expressly stated otherwise or the context requires otherwise.

Throughout the description and claims of this specification, features, components, elements, integers, characteristics, properties, compounds, chemical moieties or groups described in conjunction with a particular aspect, embodiment or example of the invention are to be understood to be applicable to any other aspect, embodiment or example described herein unless incompatible therewith or expressly stated otherwise.

The invention claimed is:

1. A volume optical element comprising:
    a carrier having a diffractive optical relief pattern on at least one surface thereof, the diffractive optical relief pattern comprising a plurality of diffractive optical relief features, and
    at least one optically functional layer applied over or onto at least one or more portions of the diffractive optical relief pattern on the carrier, and
    wherein the at least one optically functional layer comprises a plurality of discrete bodies, beads or globules of optically functional material, and respective individual ones of the said bodies, beads or globules are located over or on respective individual ones of the said diffractive optical relief features of the relief pattern on the carrier, and
    wherein the plurality of bodies, beads or globules of optically functional material forming the at least one optically functional layer are substantially separate or spaced from each other, whereby the at least one optically functional layer is substantially discontinuous over one or more portions, regions or areas of the relief pattern on the carrier.

2. A volume optical element according to claim 1, wherein the or each individual one of the bodies, beads or globules of optically functional material forming the optically functional layer is positioned or located atop or around, or at least partially surrounding an upper portion of a respective individual one of the said diffractive optical, relief features of the relief pattern on the carrier.

3. A volume optical element according to claim 1, wherein the plurality of bodies, beads or globules applied on the carrier are each shaped or configured so as to be closer together, relative to one another, at their top or upper portions or regions than at their bottom or lower portions or regions.

4. A volume optical element according to claim 1, wherein the total thickness of the volume optical element is in the range of from about 2 μm up to about 500 μm, optionally from about 10 μm up to about 110 μm.

5. A volume optical element according to claim 1, wherein the carrier has a general thickness, or an average thickness if the optical relief pattern on its surface is taken into account in that calculation, in the range of from about 2 μm up to about 350 μm, optionally from about 10 μm up to about 100 μm.

6. A volume optical element according to claim 1, wherein the or each of the at least one optically functional layer(s) has an overall general thickness, or an overall average thickness if any non-planar surface profile thereof is taken into account in that calculation, in the range of from about 5 nm up to about 150 μm, optionally from about 10 nm up to about 10 μm.

7. A volume optical element according to claim 1, wherein:
    (a) the carrier material is selected from:
        (i) natural or synthetic polymeric materials selected from the group consisting of: PET, PC, PE or PP, or
        (ii) metals selected from the group consisting of: Al, Ag, Au, Cu or Ni, or
        (iii) ceramics selected from the group consisting of: oxide ceramics, carbon ceramics or composite ceramics, or
        (iv) geopolymers;
    and/or
    (b) the optically functional material of the applied at least one optically functional layer is selected from one or more metal oxides selected from the group consisting of: $Ta_2O_5$, $TiO_2$, $Fe_2O_3$, $Co_3O_4$, $ZrO_2$, $WO_3$ and ZnO.

8. A volume optical element according to claim 1, wherein the optically functional material of the at least one optically functional layer has a refractive index that is different from the refractive index of the material of the carrier.

9. A volume optical element according to claim 1, wherein the element comprises a plurality of the said optically functional layers, including:
  (i) at least one first optically functional layer applied over or onto at least one or more portions of the diffractive optical relief pattern on the carrier, wherein the first optically functional layer comprises a first plurality of discrete bodies, beads or globules of optically functional material, and respective individual ones of the said bodies, beads or globules of the first plurality are located over or on respective individual ones of the said diffractive optical relief features of the relief pattern on the carrier, and
  (ii) one or more second or subsequent optically functional layers applied over the first optically functional layer, wherein the or each second or subsequent optically functional layer comprises a second or subsequent (as the case may be) plurality of discrete bodies, beads or globules of optically functional material, and respective individual ones of the said bodies, beads or globules of the second or subsequent (as the case may be) plurality are located over or on respective individual ones of the first plurality (or an underlying second plurality, as the case may be) of discrete bodies, beads or globules of optically functional material forming the first optically functional layer (or underlying second optically functional layer, as the case may be),
  so as to form a plural-layered volume optical element comprising a plurality of individual optically functional layers sandwiched one on top of another;
  optionally wherein each optically functional layer has associated therewith its own underlying discrete basal sub-carrier layer with its own respective diffractive optical, relief pattern thereon, whereby the optical element is a plural-layered volume optical element comprising:
  a plurality of carrier sub-layers each having a respective diffractive optical relief pattern on at least one surface thereof, and
  applied over or onto at least one or more portions of each respective diffractive optical relief pattern on respective ones of the carrier sub-layers, respective ones of a plurality of optically functional layers, each said optically functional layer, each said optically functional layer comprising a respective plurality of discrete bodies, beads or globules of optically functional material, and respective individual ones of the said bodies, beads or globules in each said plurality thereof are located over or on respective individual ones of the said diffractive optical relief features of the respective diffractive optical relief pattern on the respective carrier sub-layer.

10. A method for the production of a volume optical element, the method comprising:
  providing a carrier having a diffractive optical relief pattern on at least one surface thereof, the diffractive optical relief pattern comprising a plurality of diffractive optical relief features, and
  applying over or onto at least one or more portions of the diffractive optical relief pattern on the carrier at least one optically functional layer,
  wherein the at least one optically functional layer is applied in the form of a plurality of discrete bodies, beads or globules of optically functional material, and respective individual ones of the said bodies, beads or globules are applied over or onto respective individual ones of the said diffractive optical relief features of the relief pattern on the carrier so as to be substantially separate or spaced from each other, whereby the at least one optically functional layer is substantially discontinuous over one or more portions, regions or areas of the relief pattern on the carrier.

11. A method according to claim 10, wherein the application of the at least one optically functional layer over the at least one or more portions of the relief pattern on the carrier is carried out by a deposition method comprising vacuum deposition or vacuum sputtering.

12. A method according to claim 10,
  wherein the method further comprises a step of subjecting the applied bodies, beads or globules to an agglomeration or merging process, or a step of subjecting the applied bodies, beads or globules to an infilling step using the same or a compatible material to the bodies, beads or globules themselves, so as to at least partially fill the gaps or spaces between them to form a final homogenous optically functional layer, optionally an optically functional layer with the originally applied bodies, beads or globules embedded therewithin.

13. A method according to claim 12, wherein
  the method further comprises a step of subjecting the resulting exposed upper surface of the merged or infilled optically functional layer to a process of back-scratching, scraping, polishing, erosion or abrasion in order to create a substantially planar or flat exposed upper surface of the applied optically functional layer on the carrier.

14. A method according to claim 10, wherein the method further comprises a step of laminating the thus-produced optical element with at least one superimposing over-layer or laminating layer, optionally wherein the material of the carrier and/or of the superimposed over-layer or laminating layer moves, under conditions of elevated heat and/or pressure, into and/or through any gaps or openings in between the optically functional layer's bodies, beads or globules during the lamination step.

15. A method according to claim 10, wherein a plurality of the said optically functional layers, including at least one first optically functional layer, are applied over or onto at least one or more portions of the relief pattern on the carrier, and one or more second or subsequent said optically functional layers are applied over the first optically functional layer, so as to form a plural-layered volume optical element comprising a plurality of individual optically functional layers sandwiched one on top of another;
  optionally wherein each optically functional layer is applied together with its own underlying discrete basal sub-carrier layer with its own respective diffractive optical relief pattern thereon, whereby the resulting optical element is a plural-layered volume optical element comprising:
  a plurality of carrier sub-layers each having a respective diffractive optical relief pattern on at least one surface thereof, and
  applied over or onto at least one or more portions of each respective diffractive optical relief pattern on respective ones of the carrier sub-layers, respective ones of a plurality of optically functional layers.

16. A security device for incorporation into or onto a product, item or article, the security device comprising or including a volume optical element according to claim 1 or a volume optical element produced by the method according to claim 10.

* * * * *